Dec. 18, 1956 W. M. GILMAN ET AL 2,774,926
CONTROL CIRCUITS FOR ELECTRIC TRUCKS
Filed Aug. 29, 1952 5 Sheets-Sheet 1

Inventors:
Wilbert M. Gilman,
Peter F. Gandolfo,
by Hardley Cluttick Attorney

Dec. 18, 1956  W. M. GILMAN ET AL  2,774,926
CONTROL CIRCUITS FOR ELECTRIC TRUCKS
Filed Aug. 29, 1952  5 Sheets-Sheet 2
*Fig. 2.*
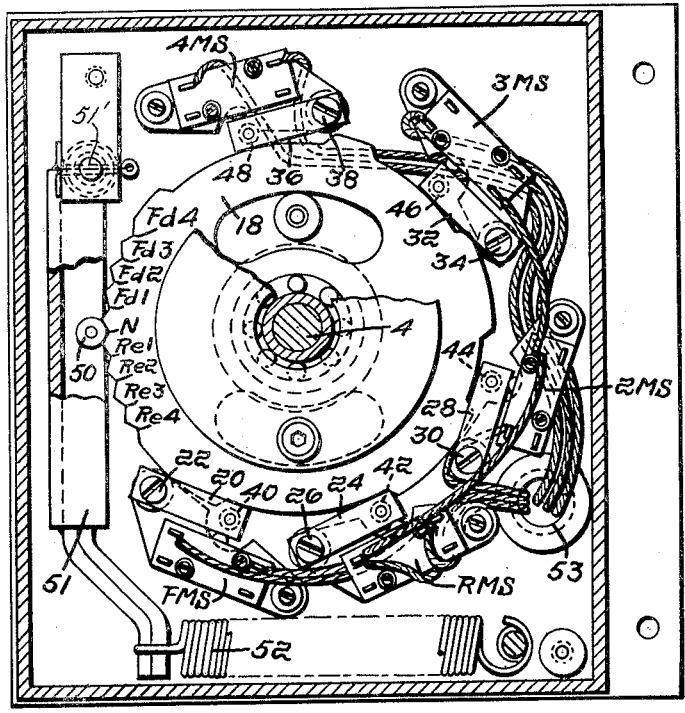
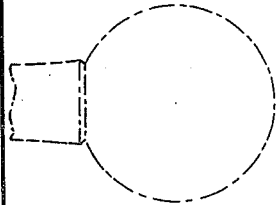
*Fig. 4.*
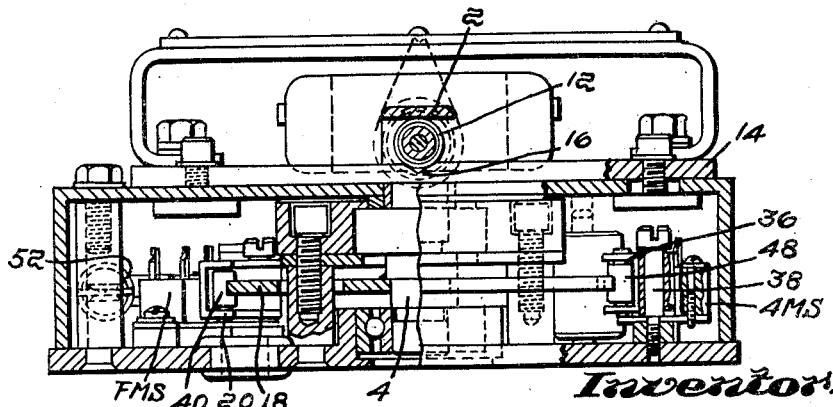
Inventors:
Wilbert M. Gilman,
Peter F. Gandolfo,
by Charley Chittick Attorney

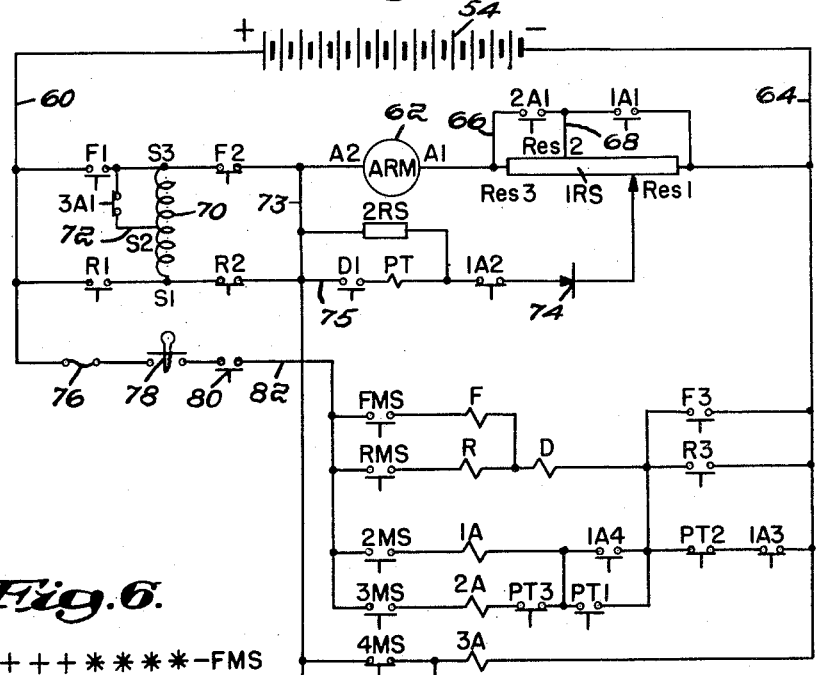

Dec. 18, 1956  W. M. GILMAN ET AL  2,774,926
CONTROL CIRCUITS FOR ELECTRIC TRUCKS
Filed Aug. 29, 1952  5 Sheets-Sheet 4

Inventors:
Wilbert M. Gilman,
Peter F. Gandolfo,
by Yardley Chittick Attorney

Dec. 18, 1956  W. M. GILMAN ET AL  2,774,926
CONTROL CIRCUITS FOR ELECTRIC TRUCKS
Filed Aug. 29, 1952  5 Sheets-Sheet 5

Inventors:
Wilbert M. Gilman,
Peter F. Gandolfo,
by C. Yardley Chittick Attorney United States Patent Office 2,774,926
Patented Dec. 18, 1956

2,774,926

CONTROL CIRCUITS FOR ELECTRIC TRUCKS

Wilbert M. Gilman, Wellesley Hills, and Peter F. Gandolfo, Watertown, Mass., assignors to Lewis-Shepard Company, Watertown, Mass., a corporation of Massachusetts Application August 29, 1952, Serial No. 307,016

6 Claims. (Cl. 318—284)

This invention relates to circuits for controlling the operation of electrically operated trucks. The invention has found particular use in that type of electric truck which is commonly used in industry for facilitating material handling. Such trucks are used in factories for moving material from one place to another, in warehouses for shifting goods about, on docks and railway platforms for handling freight and in many other places. In the operation of such trucks, the operator is provided with a steering wheel or steering lever for directing the truck, a control lever for causing the circuits to be set to move the truck forward or backward at the proper speed and a brake, usually foot operated, for bringing the truck to a positive halt.

Trucks of the type herein referred to are customarily battery operated although in some cases a motor generator set is provided. In both forms however, the current supplied is direct current. By varying the armature circuit resistance and, in some cases, the motor series field, the speed of the truck can be controlled. Such trucks not only have multiple forward speeds but also multiple reverse speeds.

The practice among some operators of these trucks is to use the motor as a brake in place of the foot brake, by throwing the control lever into a position which will tend to cause the motor to drive the truck in the opposite direction. This produces a strong braking effect. Then as soon as the truck has come to a halt from its original direction, it will commence to move in the reverse direction. That is to say, when a truck is moving forward, for example, under the influence of controls set for that direction and speed, the operator may decide to reverse the truck's direction. To do so, the operator may move the control lever from its forward speed position quickly through neutral into a reversing circuit position to cause rapid deceleration of the truck by the dynamic braking effect of the motor and subsequent immediate acceleration in the opposite direction to the speed selected. Operation of the control lever in this manner is called plugging and obviously special electrical circuits are required if damage to the motor is to be avoided. That is to say, if the control lever is suddenly moved from full speed forward, with the truck moving forward at a corresponding speed, to full speed reverse, some means must be introduced to limit the current flowing under this reversing operation to a value which will not be detrimental to the motor or truck. After the truck has been halted by the dynamic braking effect, the circuits must so set themselves that the motor can accelerate in reverse in the normal manner to the speed required.

In the preferred form of the present invention, the circuits contemplate a neutral position, four speeds forward and four speeds reverse. If the truck is stationary the operator may move the control lever at will to any position in forward or reverse after which the motor will accelerate until the truck is brought to the speed called for. If the truck is moving forward at any selected speed, the control lever may be moved slowly or quickly to any selected reverse speed, after which the truck will decelerate under the dynamic braking influence of the motor and then accelerate in the opposite direction to the speed called for.

With the foregoing in mind, it is a principal object of the present invention to provide controlling circuits for a direct current motor in a truck designed to go forward or backward, which circuits may be set slowly or quickly any time by the operator for any speed forward or backward. The circuit when so set will thereafter result in actuation of the motor in a smooth nondamaging way, so that the truck may be accelerated to a higher speed in the same direction or decelerated to a lower speed in the same direction or stopped and accelerated to any selected speed in the reverse direction. The circuits of the present invention result in smooth acceleration of the motor and truck in either direction to the speed called for by the control lever setting and when reversing of the motor is called for by plugging (quick movement of the control lever from forward to reverse position), such reversal operation occurs smoothly without damage to the motor or the truck.

These and other objects of the invention will become more apparent as the description proceeds with the aid of the accompanying drawings in which:

Fig. 2 is a plan view of the switch box shown in Fig. 1 with the cover of the box removed.

Fig. 4 is an end elevation looking from the right of Fig. 1 with the switch box broken away to show some of the switches and cam plate.

Fig. 5 is a diagram of the wiring circuit with the control handle in neutral.

Fig. 6 is a diagram showing which contacts are closed and which contacts are open for any given position of the control handle.

Figure 1:
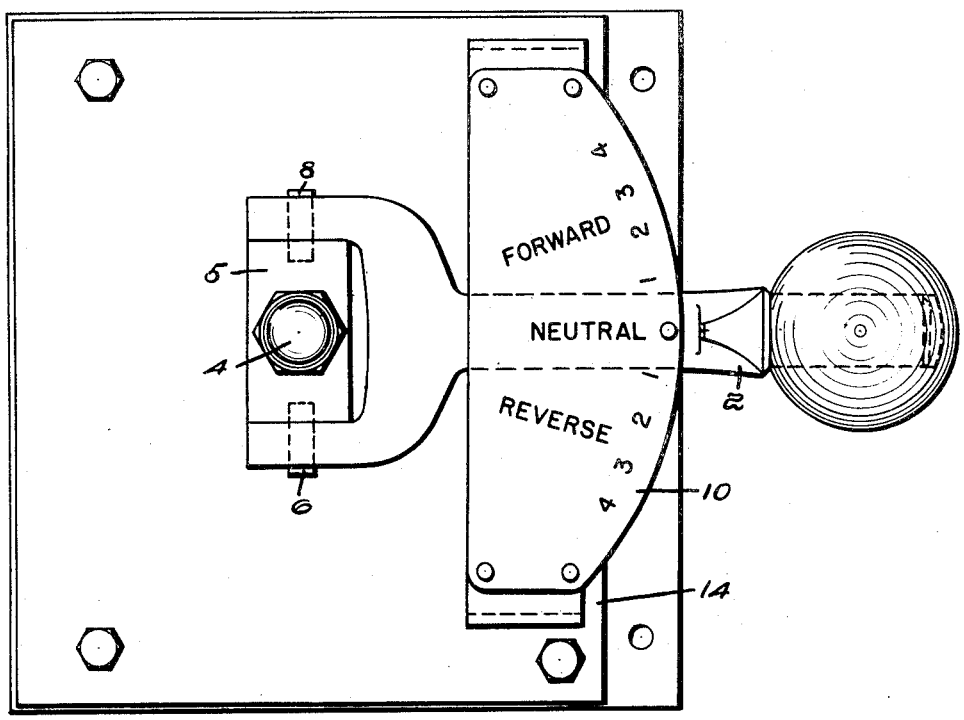
Fig. 1 is a plan view of the control lever mounted on the truck in a position for convenient use by the operator.
Figure 3:
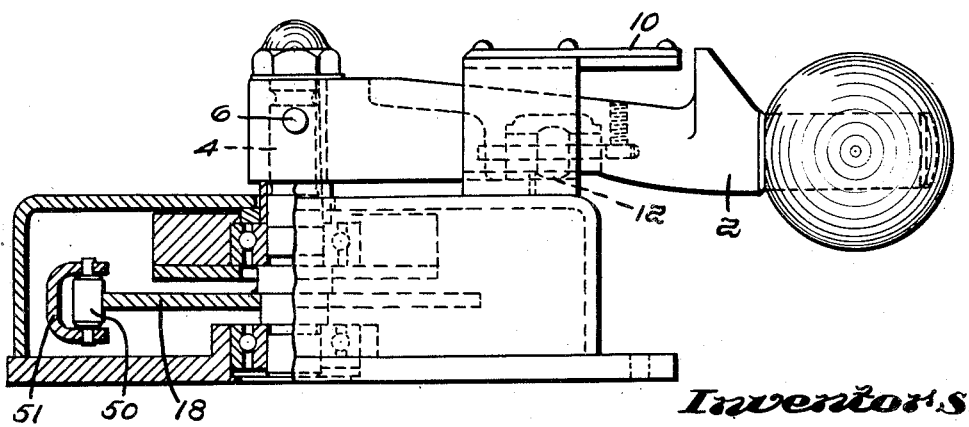
Fig. 3 is a side elevation of Fig. 1 with the left hand side of the switch box broken away in part to show the cam plate and cam shaft bearings.

Referring to Fig. 1 there is shown a plan view of the top of the switchbox and control handle that is used by the operator to set the various circuits for movement of the truck at any of four selected speeds forward or any of four selected speeds in reverse. In this view there is shown the control handle 2 connected to a block 5 keyed to a vertical cam shaft 4. Pivots 6 and 8 serve to provide for limited vertical movement of handle 2. The handle is located under a bridge 10 which has suitable markings thereon, so that the operator will know where to place the handle for desired truck direction and speed. These positions are shown as forward, neutral and reverse. In the forward sector are speed positions one, two, three and four and in the reverse section are similar speed positions one, two, three and four. For easy swinging, the handle 2 rides on a roller 12 which runs on the surface of a plate 14. A notch 16 in plate 14 will receive roller 12 when lever 2 is in neutral.

Referring now to Fig. 2 the cam shaft 4 has affixed thereto a cam 18 with its outer periphery cut in a particular manner to operate a plurality of switches which are spaced about its circumference. These switches are numbered FMS, RMS, 2MS, 3MS and 4MS. Each switch has an operating lever pivotally related thereto which is moved by the cam to actuate the switch. These operating levers are 20 pivoted at 22, 24 pivoted at 26, 28 pivoted at 30, 32 pivoted at 34 and 36 pivoted at 38. At the free ends of the levers are rollers 40, 42, 44, 46 and 48 against which the cam 18 acts when moved to appropriate operating positions to cause in turn the actuation of the selected switch or switches. The switches are of the snap action type and can be wired to be normally open or closed. On the left side of cam 18 as viewed in Fig. 2 are a plurality of notches which have been numbered N, F$d$1, F$d$2, F$d$3, F$d$4, R$e$1, R$e$2, R$e$3 and R$e$4. One of these notches will be in engagement with a roller 50 when the handle 2 is in neutral or any one of the selected forward or reverse speeds. Roller 50 is mounted in a frame 51 pivoted at 51' and urged to the right by spring 52. Roller 50 will always exert enough pressure against any notch in the side of the cam to hold the cam in any selected position.

It should be noted that roller 40 of switch FMS and roller 42 of switch RMS are both adjacent to shoulders of cam 18 so that rotation of the cam in either direction to position F$d$1 or R$e$1 will immediately cause actuation of switch FMS or RMS. With cam 18 in neutral position, roller 44 of switch 2MS is midway between the cam shoulders which shoulders are so spaced that the cam must be moved to either F$d$2 or R$e$2 position before switch 2MS will be actuated. Similarly, roller 46 of switch 3MS is midway between a pair of cam shoulders which are spaced still further apart so that cam 18 must be moved to position F$d$3 or R$e$3 before switch 3MS is actuated. Roller 48 of switch 4MS is likewise midway between its pair of cam shoulders so that the cam 18 must be moved to position F$d$4 or R$e$4 before switch 4MS will be actuated. It should be noted that the wires connected to switch 4MS are connected to those terminals which are normally closed when the switch is in unactuated position. All of the other switches FMS, RMS, 2MS and 3MS in unactuated position are normally open. The various wires shown in Fig. 2 leading from the several switches are collected together to lead downwardly through a hole 53 in the bottom of the switch box to be connected with the various contacts which will hereinafter be described. The units which are operated by the closing of the various switches, comprise coils which form small electromagnets when energized, to cause the movement of armatures which close or open the contacts as required. Some of the contacts are normally open while others are normally closed. Actuation of the electromagnetic coils causes the contacts to move from closed to open or open to closed position as the case may be.

From the foregoing and from an examination of the cam formation, it is believed apparent that with the cam in neutral position as shown, no switch will be actuated as all the rollers 40, 42, 44, 46 and 48 will be in the cam valleys.

If the operator moves handle 2 to first speed forward which means rotating cam 18 to the left to position F$d$1, switch FMS will be closed by virtue of the engagement of the cam with roller 40. When cam 18 is rotated to position F$d$2, switch FMS remains closed and in addition switch 2MS will be closed. When the cam is rotated to position F$d$3, switch FMS remains closed, switch 2MS remains closed and in addition, switch 3MS will now be closed. When the cam is rotated to position F$d$4, switches FMS, 2MS and 3MS will all remain closed, but 4MS which heretofore has not been actuated will now be actuated and opened. Switch RMS remains unactuated when the cam 18 is in any of the forward positions—F$d$1 to F$d$4. When the cam 18 is rotated to the right from the neutral position N, it will successively cause actuation of switch RMS for position R$e$1, RMS and 2MS for positions R$e$2, RMS, 2MS and 3MS for positions R$e$3 and RMS, 2MS, 3MS and 4MS for position R$e$4. The only difference in the switch actuation between forward and reverse is that in reverse switch FMS is unactuated and open while switch RMS is actuated and closed through all reverse positions. The movement of switches 2MS, 3MS and 4MS is identical for corresponding forward or reverse speeds. The foregoing explanation of the switch actuation as cam 18 is rotated to forward or reverse positions is shown diagrammatically in Fig. 6.

Attention is now called to Fig. 5 showing the wiring diagram and the switches FMS, RMS, 2MS, 3MS and 4MS just referred to. The circuit in Fig. 5 is in neutral position. Other elements of the circuit will now be referred to. The battery 54 has one wire 60 leading to the motor circuit in which are normally open contacts F1, normally closed contacts F2, the armature 62, resistance 1RS and wire 64 which connects with the other side of the battery. A shunt 66 about resistance 1RS includes normally open contacts 2A1 and normally open contacts 1A1 with wire 68 between the switches leading to an intermediate point in the resistance 1RS. Another parallel circuit includes the normally open contacts R1 and the normally closed contacts R2. The series field 70 of the motor 62 has a tap 72 which includes the normally closed contacts 3A'. Bar 73 leads back to the motor circuit.

Another circuit 75 includes the normally open contacts D1, the operating coil PT of the plugging relay, normally closed contacts 1A2 and a selenium disc rectifier 74, which rectifier has a lead running to a selected location on the resistance 1RS. Other elements of the circuit include in parallel a fuse 76, key switch 78 which will be closed when the truck is in use, and dead man's switch 80 shown open, but which, whenever the truck is being used, will also be closed. Wire 82 leads to the switches FMS, RMS, 2MS and 3MS all in parallel. Switch 4MS is connected with bar 73.

Connected to switch FMS is operating coil F which when actuated closes contacts F1, and opens contacts F2 and closes holding contacts F3. In the RMS switch circuit is coil R which when actuated closes contacts R1, opens contacts R2 and closes holding contacts R3. The coil D in the FMS and RMS circuits controls the actuation of the contacts D1. In the circuit of switch 2MS is coil 1A which when actuated closes contacts 1A1, opens contacts 1A3 and closes contacts 1A4 and opens contacts 1A2.

In the circuit of switch 3MS is coil 2A which when actuated causes contacts 2A1 to close and contacts 2A2 to open. Contacts PT1 are closed and contacts PT2 and PT3 are opened upon the actuation of coil PT. Coil 3A, in the 4MS switch circuit, when actuated maintains contacts 3A open and when unactuated permits it to assume its normally closed position.

With the circuit shown in Fig. 5 in mind which is the situation with lever 2 in neutral, it will be understood that no current will flow and the truck will be motionless. Let us assume that the operator now desires to cause the truck to move forward. Switches 78 and 80 will be mechanically closed by the operator and will remain closed throughout the truck operation. The operator now moves lever 2 to position F$d$1. The circuits then shown by the heavy lines in Fig. 7 will at once be established. Switch FMS will be closed causing current to flow through coils F, D, and contacts PT2 and 1A3, which are normally closed as shown in Fig. 5. Switch 4MS, normally closed, energizes coil 3A holding contacts 3A1 open. Current flow through coil F results in the closing of contacts F1, the opening of contacts F2 and the closing of contacts F3. With contacts F3 closed a holding circuit is now established through switch FMS, coils F and D and contacts F3. Current flow in coil D results in the closing of contacts D1 to establish a circuit through coil PT, normally closed contacts 1A2, through the selenium disc 74 to the resistance 1RS. Energizing of coil PT results in the opening of contactors PT2 and PT3 and the closing of contacts PT1. In this manner, a circuit is established for the armature 62 through F1, field 70, R2, bar 73, armature 62 and resistance 1RS. The current flowing through the field 70 is in a direction to cause the armature to rotate in a direction to move the truck forward. With the maximum resistance 1RS in the circuit, the motor runs at the lowest speed.

Figure 7:
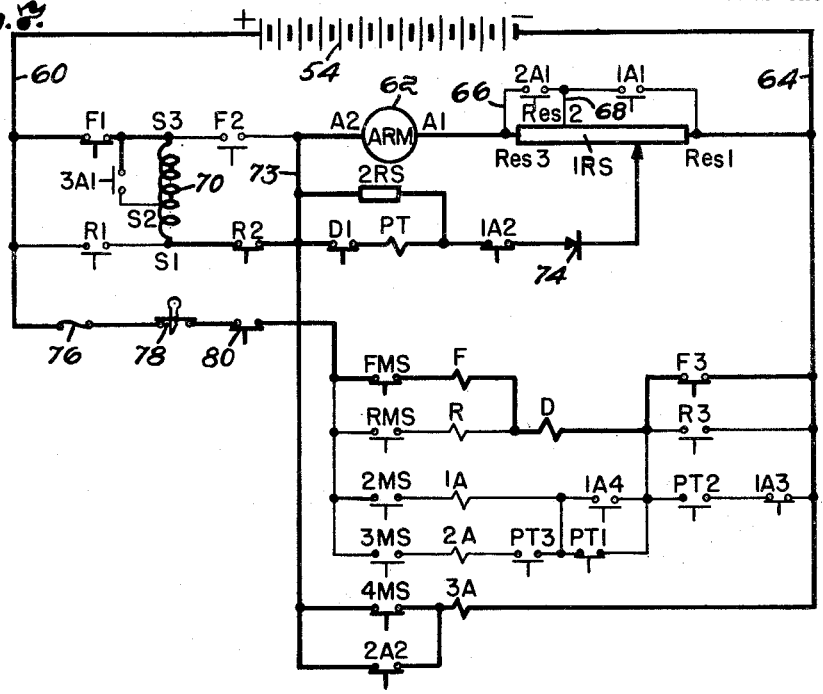
Fig. 7 is a wiring diagram for first speed forward showing the closed circuits in heavy line.
Figure 8:
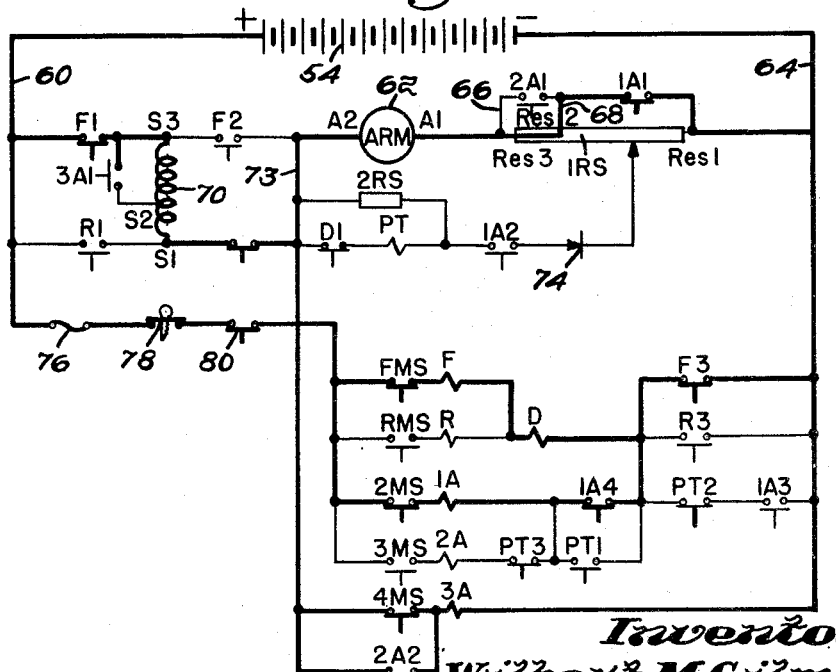
Fig. 8 is a wiring diagram for second speed forward showing the closed circuits in heavy line.

After reaching first speed, the operator then may move the control lever 2 to position Fd2. This causes the following changes in the circuits as shown in heavy line in Fig. 8. Switch 2MS is closed, permitting current to flow momentarily through coil 1A, contacts PT1 which are closed as shown in Fig. 7, and thence through contacts F3. Energizing coil 1A then closes contacts 1A4 which heretofore had been open. Contacts 1A1 are also closed cutting out part of resistance 1RS, contacts 1A2 are opened, thus deenergizing delayed action coil PT causing contacts PT1 to open (but only after 1A4 has closed) and contacts PT2 and PT3 to close. Switch 4MS which is normally closed remains closed so coil 3A causes switch 3A1 to remain open. Thus, with part of the resistance cut out of the armature circuit the speed of truck is correspondingly increased.

Figure 9:
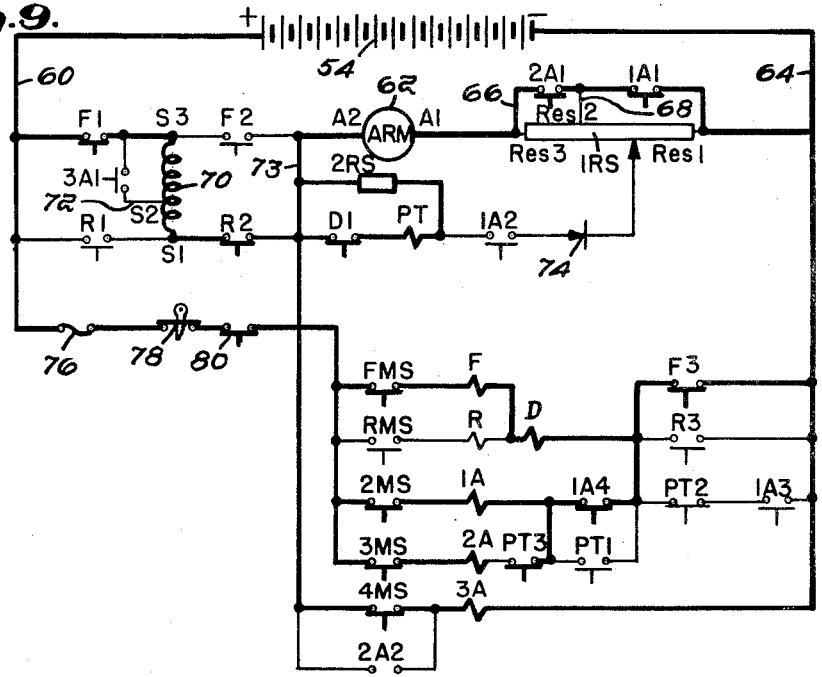
Fig. 9 is a wiring diagram for third speed forward showing the closed circuits in heavy line.

If the operator now shifts control lever 2 to position Fd3, the circuits established will be shown in the heavy line in Fig. 9. With the lever in Fd3 position, switches FMS, 2MS, 3MS will be closed and switch 4MS will remain in its normally closed position. Upon the closing of switch 3MS, current can flow through coil 2A, normally closed contacts PT3, contactor 1A4 and contacts F3 to the line 64. Energizing of coil 2A causes contacts 2A1 to close, thus cutting out all the remaining resistance of 1RS. The loop that includes contacts D1, coil PT and resistance 2RS is alive but no current is flowing, hence coil PT is deenergized and contacts PT3 are closed, contacts PT1 are open and contacts PT2 are closed. With all of the resistance now cut out of the motor circuit, the motor rotates at higher speed, thus accelerating the truck to a faster pace. Current is still flowing through the entire field 70 as switch at 3A1 actuated by coil 3A is held open.

Figure 10:
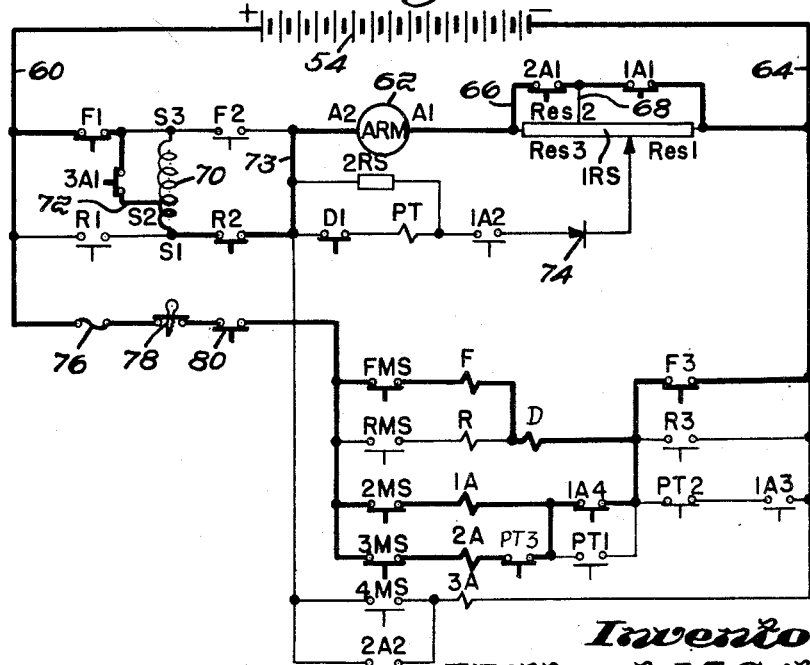
Fig. 10 is a wiring diagram for fourth speed forward showing the closed circuits in heavy line.

If the operator now desires the truck to go at maximum speed, he may move the lever 2 to position Fd4 which will cause the establishment of the circuit shown in heavy lines in Fig. 10. With the cam 18 in Fd4 position, switches FMS, 2MS and 3MS will be closed, but the previously normally closed switch 4MS will now be open. By maintaining switches 2MS and 3MS closed, contacts 1A1 and 2A1 will remain closed, thus continuing the shunt around resistance 1RS. Opening of switch 4MS deenergizes coil 3A. No current can pass to coil 3A through the alternative route of contacts 2A2 as the latter remain open so long as coil 2A is energized with switch 3MS and contacts PT3 closed. Thus, the failure of coil 3A causes contacts 3A1 which are normally closed in the absence of energization of coil 3A, to close. This shunts part of the field 70. As is well understood with direct current motors, reducing the field will cause an increase in the speed of the armature, thereby further increasing the speed of the truck.

The foregoing consideration of the circuit has contemplated the slow advance by the operator of control lever from neutral through positions Fd1, Fd2, Fd3 and Fd4. On the other hand, if the operator should advance the control lever instantly from neutral to position Fd4, for example, the operating sequence in functioning of the various elements will be as follows:

This rapid movement of cam 18 will actuate four of the five switches, closing the three normally open switches FMS, 2MS and 3MS and opening the normally closed switch 4MS. The operating coils F and D are energized through switch FMS and the normally closed auxiliary contacts PT2 and 1A3 causing the contacts F1 and D1 to close and opening contacts F2. As switch 3A1 is normally closed at this instant of initial movement of cam 18, the full battery voltage will be placed across the lower section S2—S1 of the motor series field and A2—A1 of the armature 62 and across Res3—Res1 the starting resistor 1RS. The closing of contacts F1 will also energize coil 3A through the normally closed auxiliary contacts 2A2, thereby opening the normally closed contacts 3A1 and cutting in the section S3—S2 of the series field. Thus, as the motor starts, it will use its full field and all of the resistance 1RS.

The closing of contacts D1 energizes delayed action coil PT causing it to pick up with appropriate time delay. Thus, upon the energization of coil PT, contacts PT1 is closed, thus energizing coil 1A through the switch 2MS. The closing of the normally open contact 1A1 then short circuits section Res1—Res2 of the resistance 1RS thereby producing the second speed of the motor. The energizing of coil PT also opens each of the normally closed contacts PT2 and PT3, PT2 being in series with the normally closed contacts 1A3 and PT3 being in series with coil 2A.

The picking up or energizing of coil 1A results in the opening of the normally closed contacts 1A2 which are in series with coil PT, thus breaking the supply circuit to coil PT permitting the current in this coil to decay through control resistance 2RS causing PT to drop out with suitable time delay. With the dropout of PT, its normally closed auxiliary contacts reclose. That is to say, contacts PT3 reclose, PT1 open and PT2 reclose. This operates coil 2A through switch 3MS and the now closed contacts 1A4. The closing of the normally open switch 2A1 short circuits the remaining section Res2—Res3 of the starting resistor 1RS placing the motor in the third speed position and simultaneously opens the normally closed contacts 2A2.

Since switch 4MS is already open (the control lever being in position Fd4), the opening of contacts 2A2 breaks the circuit to coil 3A which then drops out with suitable time delay, thus causing the reclosing of the normally closed contacts 3A1 to short circuit section S3—S2 of the motor series field, thereby providing fourth or high speed position.

When the control lever is moved in the reverse direction from position Fd4 to neutral by single steps, there is no delay in the reopening of switch 3A1 as switch 4MS is closed energizing coil 3A. In going from third to second speed, there is no delay, as the switch 2A1 opens as soon as switch 3MS is opened. In going from second to first speed, there is no delay since on the opening of switch 2MS, contacts 1A1 open immediately. On returning the control lever to neutral all the control circuits are broken, all the contacts drop out and the truck coasts.

On plugging from full speed forward to full speed reverse, or vice versa, switch 4MS first recloses and switches 3MS, 2MS and FMS successively reopen, thereby causing contacts 2A1, 1A1 and F1 to successively reopen. The switching sequence then passes through neutral and into the first speed in the opposite direction. Since switch RMS, the reversing switch, is now closed, coils R and D will be energized by current flowing through the normally closed contacts PT2 and 1A3 which are in series. This closes contacts R1, R3 and D1 and opens R2. Current will then flow to the motor through contacts R1, series field 70 and the normally closed contacts F2. The direction of the series field is thus reversed. The series field has also simultaneously been cut in at full field strength by the opening of the normally closed contact 3A1, achieved by the closed circuit 2A2 and 3A. The armature of the motor is accordingly plugged across the battery with the full starting resistance Res3—Res1 in series, thereby developing a strong but controlled dynamic braking effect on the truck which is still moving in its initial direction. That is to say, while the truck is continuing in its initial direction, the current is flowing in a reverse direction through the field, tending to make the motor rotate in the opposite direction. The resulting induced electromotive force which has been reversed in direction by the reversal of the series field, now acts in the same direction as the resistance drop through the armature and resistance 1RS, thereby reversing or reducing to zero the net voltage across the operating coil PT. Since the presence of the rectifier 74 in the circuit prevents flow of current in the reverse direction, coil PT will not pick up until the induced EMF approaches zero as the truck gradually comes to rest. The voltage across the coil PT then increases in original direction to a value sufficient to cause PT to pick up and then automatic acceleration in the reverse direction through speeds Re2, Re3 and Re4 proceeds in the same sequence as described above.

From the foregoing explanation, it is believed clear that the circuits that will ultimately be established with the control lever in corresponding forward or reverse positions are identical with the exception of the direction of flow of current through the series field 70, which change in field direction merely has the effect of changing the direction of rotation of the motor. It will further be seen that we have provided a control for a truck of the type described in which the operator is free to shift the control lever into forward or reverse at any time and at any speed without causing damaging results. If the control lever is advanced rapidly, the various contacts will pick up in proper succession, thus producing smooth but rapid acceleration. If the control lever is advanced slowly step by step, then acceleration will be in accord with such lever operation. If the truck is going in one direction and the operator quickly throws the control lever from any speed in that direction to a speed in the opposite direction, the contacts will fall out of action in sequence and will then go back into action in reverse sequence to cause the truck to go in the reverse direction after it has come to a halt under the effect of the dynamic braking of the motor in reverse low speed. If the control lever is brought to neutral, there will be no dynamic braking effect. Instead, the truck will merely coast to a halt or can be stopped by the use of the manually operated brake. The introduction of the rectifier 74 prevents flow of current in the reverse direction to the coil PT. Therefore the only reverse circuit that can be established prior to the truck coming to a virtual standstill is low speed reverse. This permits effective dynamic braking without damage to motor or truck. The subsequent accelerating circuits in reverse will be established only after the truck has been stopped and PT is energized following decay of the counter EMF.

In the foregoing description of the invention reference has been made to the use of the control circuits in connection with a motor used by electrically operated trucks. The term trucks is not to be construed as in any way limiting the invention for obviously the control circuits may be used with all other types of vehicles utilizing a direct current motor and speed controlling circuits of the type disclosed herein. Such other vehicles may be those known as tractors, pushers and other types of self-propelled vehicles regardless of their intended use. Where the term truck is used in any of the claims, such other types of vehicles are to be considered synonymous therewith.

It is our intention to cover all changes and modifications of the example of the invention herein chosen for purposes of the disclosure which do not constitute departures from the spirit and scope of the invention.

We claim:

1. Controlling circuits for use with a direct current motor in an electric driven truck for causing said motor to run in either direction, said circuits including a reversible series field for said motor, a circuit shunted around said motor armature which includes a coil for actuating contactors for establishing circuits for varying the speed of the motor, said shunt circuit having therein a rectifier for preventing flow of current in said shunt in the direction the reverse of that in which current normally flows during acceleration of the said motor in one direction, thereby to prevent the actuation of said coil when said field is reversed before said motor has been stopped and while a counter EMF is being generated by said armature.

2. Circuit control means for a direct current motor having a series field, circuits for providing a plurality of forward speeds and circuits for providing a plurality of reverse speeds, means for causing automatic sequential operation of the circuits until the manually selected speed is reached and upon plugging, means for causing said circuits to be set for the lowest speed in the opposite direction until said motor has been dynamically braked to substantially zero speed, after which said circuits will automatically establish themselves for reverse motor rotation until the selected speed circuit is reached.

3. In an electrical direct current control system for a motor driven vehicle designed to provide automatic acceleration from rest to maximum speed and to provide in reversing or plugging operation, a controlled dynamic braking of the vehicle during its deceleration from initial values substantially to rest, a plurality of coils and contactors operated thereby for automatically establishing circuits in sequence and means for preventing during the deceleration period the premature picking up of the contactor which controls the termination of dynamic braking and the initiation of the acceleration sequence.

4. The control system set forth in claim 3 in which the said means for preventing premature picking up of the contactor comprises a circuit tapped across the motor armature and part of a regulating resistor in series with the said motor armature, said circuit including an operating coil of a control contactor and means for substantially preventing reverse flow of current in said circuit.

5. In an electric direct current control system for a motor driven vehicle designed to provide automatic acceleration from rest to maximum speed and to provide in reversing or plugging operation a controlled dynamic braking of the vehicle during its deceleration from initial value substantially to rest, a master controller which may be moved from a position corresponding to a speed in one direction through neutral to a position corresponding to a speed in the opposite direction, a plurality of coils and contactors operated thereby for automatically establishing power circuits in sequence, one of said contactors being a plugging contactor, means for preventing the picking up of the contactor which controls second or higher speed operation in direction opposite to that in which the vehicle was initially proceeding unless the said plugging contactor is in the deenergized position, thereby preventing the premature energizing of the directional contactor which subsequently initiates the accelerating sequence, before the vehicle has come substantially to rest.

6. In an electric direct current control system for a motor driven vehicle designed to provide automatic acceleration from rest to maximum speed and to provide in reversing or plugging operation a controlled dynamic braking of the vehicle during its deceleration from initial value substantially to rest, a master controller capable of being moved from a position corresponding to a speed in one direction through neutral to a position corresponding to a speed in the opposite direction, a plurality of coils and contactors operated thereby for automatically establishing circuits in sequence one of said contactors being a plugging contactor which controls the termination of dynamic braking and the initiation of the acceleration sequence, two directional contactors, a normally closed interlocking circuit in series with the operating coil of either of said directional contactors thereby preventing the picking up of the directional contactor which controls second or higher speed in direction opposite to that in which the vehicle was initially proceeding, unless the said plugging contactor is in the deenergized position, thereby preventing the initiation of the accelerating sequence until the vehicle has slowed substantially to rest.

References Cited in the file of this patent

UNITED STATES PATENTS

| | | |
|---|---|---|
| 772,277 | Eastwood | Oct. 11, 1904 |
| 791,887 | Eastwood | June 6, 1905 |
| 1,188,169 | Given | June 20, 1916 |
| 2,110,707 | Jones | Mar. 8, 1938 |
| 2,494,611 | Eisenberg | Jan. 17, 1950 |
| 2,505,281 | Elwood | Apr. 25, 1950 |